United States Patent
Hosseini et al.

(10) Patent No.: US 10,412,716 B2
(45) Date of Patent: Sep. 10, 2019

(54) COMMUNICATING CONTROL DATA BASED ON REFERENCE SIGNALS IN WIRELESS COMMUNICATIONS

(71) Applicant: QUALCOMM Incorporated, San Diego, CA (US)

(72) Inventors: Seyedkianoush Hosseini, San Diego, CA (US); Wanshi Chen, San Diego, CA (US); Shimman Arvind Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/886,584

(22) Filed: Feb. 1, 2018

(65) Prior Publication Data
US 2018/0227907 A1 Aug. 9, 2018

Related U.S. Application Data

(60) Provisional application No. 62/454,517, filed on Feb. 3, 2017.

(51) Int. Cl.
*H04W 72/04* (2009.01)
*H04W 28/18* (2009.01)
(Continued)

(52) U.S. Cl.
CPC ....... *H04W 72/0413* (2013.01); *H04L 1/1864* (2013.01); *H04L 5/0048* (2013.01); *H04L 5/0087* (2013.01); *H04L 5/0091* (2013.01); *H04W 28/18* (2013.01); *H04W 72/042* (2013.01); *H04W 72/1205* (2013.01); *H04L 5/001* (2013.01); *H04L 5/0023* (2013.01); *H04L 65/1069* (2013.01)

(58) Field of Classification Search
None
See application file for complete search history.

(56) References Cited

U.S. PATENT DOCUMENTS

2007/0149227 A1* 6/2007 Parizhsky ............. H04L 1/0026
455/509
2015/0208397 A1* 7/2015 Lee, II .................. H04L 5/0048
370/329

(Continued)

FOREIGN PATENT DOCUMENTS

WO  WO-2017/168039 A1  10/2017
WO  WO-2017/173177 A1  10/2017

OTHER PUBLICATIONS

International Search Report and Written Opinion—PCT/US2018/016583—ISA/EPO—dated Apr. 30, 2018 (171948WO) 16 pages.

(Continued)

*Primary Examiner* — Brandon M Renner
(74) *Attorney, Agent, or Firm* — Arent Fox LLP

(57) ABSTRACT

Aspects of the present disclosure describe communicating control data based on reference signals in wireless communications. A timeline for transmitting uplink communications can be determined, where the timeline can relate to whether to process downlink communications based on at least one of a first type of reference signal (RS) or a second type of RS, a length or number of symbols in the reference signal, or a timing advance.

24 Claims, 8 Drawing Sheets

(51) Int. Cl.
*H04W 72/12* (2009.01)
*H04L 1/18* (2006.01)
*H04L 5/00* (2006.01)
*H04L 29/06* (2006.01)

(56) References Cited

U.S. PATENT DOCUMENTS

| | | | | |
|---|---|---|---|---|
| 2015/0237586 | A1* | 8/2015 | Iwai | H04W 52/241 |
| | | | | 370/329 |
| 2017/0188340 | A1* | 6/2017 | Andgart | H04W 72/042 |
| 2017/0188379 | A1* | 6/2017 | Shtrom | H04B 17/102 |
| 2017/0289907 | A1 | 10/2017 | Ang et al. | |
| 2017/0290008 | A1* | 10/2017 | Tooher | H04W 72/0446 |
| 2017/0311321 | A1* | 10/2017 | Kakishima | H04W 72/0446 |
| 2017/0331547 | A1* | 11/2017 | Kim | H04B 7/26 |
| 2017/0359810 | A1 | 12/2017 | Kuchibhotla et al. | |
| 2018/0049189 | A1* | 2/2018 | Hugl | H04W 72/042 |

OTHER PUBLICATIONS

Nokia et al., "On Processing Time Reduction Between POSCH Transmission and DL HARQ Feedback", 3GPP DRAFT; R1-1609320, 3rd Generation Partnership Project (3GPP), Mobile Competence Centre; 650, Route Des Lucioles; F-06921 Sophia-Antipolis Cedex; France vol. RAN WG1, no. Lisbon, Portugal; 20161010-20161014, Oct. 9, 2016 (Oct. 9, 2016), XP051149365, 8 Pages, Retrieved from the Internet: URL:http://www.3gpp.org/ftp/Meetings_3GPP_SYNC/RAN1/Docs/ [retrieved on Oct. 9, 2016].

Ntt Docomo et al., "s(E) PDCCH for Shortened TTI", 3GPP Draft; R1-1610045, 3rd Generation Partnership Project (3GPP), Mobile Competence Centre; 650, Route Des Lucioles; F-06921 Sophia-Antipolis Cedex; France vol. RAN WG1, No. Lisbon, Portugal; 20161010-20161014, Oct. 9, 2016 (Oct. 9, 2016), XP051150070, pp. 1-8, Retrieved from the Internet: URL:http://www.3gpp.org/ftp/Meetings 3GPP_SYNC/RAN1/Docs/ [retrieved on Oct. 9, 2016].

QUALCOMM Incorporated: "DL channel design for shortened TTI", 3GPP Draft; R1-164458 DI Channel Design for Shortened TTI, 3rd Generation Partnership Project (3GPP), Mobile Competence Centre; 650, Route Des Lucioles ; F-06921 Sophia-Antipolis Cedex; France vol. RAN WG1, No. Nanjing, China; 20160523-20160527, May 14, 2016 (May 14, 2016), XP051096436, pp. 1-7, Retrieved from the Internet: URL:http://www.3gpp.org/ftp/tsg_ran/WG1_RL1/TSGR1_85/Docs/ [retrieved on May 14, 2016].

QUALCOMM Incorporated: "Downlink Design for Shortened TTI", 3GPP Draft; R1-1610007 DL Design for Shortened TTI, 3rd Generation Partnership Project (3GPP), Mobile Competence Centre; 650, Route Des Lucioles; F-06921 Sophia-Antipolis Cedex; France, vol. RAN WG1, no. Lisbon, Portugal; 20161010-20161014, Oct. 9, 2016 (Oct. 9, 2016), pp. 1-15, XP051150032, Retrieved from the Internet: URL: http://www.3gpp.org/ftp/Meetings_3GPP_SYNC/RAN1/Docs/ [retrieved on Oct. 9, 2016].

Samsung: "Overview of sTTI Operations", 3GPP Draft; R1-1612403—Overview of STTI Operations, 3rd Generation Partnership Project (3GPP), Mobile Competence Centre; 650, Route Des Lucioles, F-06921 Sophia-Antipolis Cedex; France, vol. RAN WG1, No. Reno. USA; 20161114-20161118, Nov. 13, 2916 (Nov. 13, 2016), XP051176351, pp. 1-5, Retrieved from the Internet: URL:http://www.3gpp.org/ftp/Meetings 3GPP_SYNC/RAN1/Docs/ [retrieved on Nov. 13, 2016].

* cited by examiner

COMMUNICATING CONTROL DATA BASED ON REFERENCE SIGNALS IN WIRELESS COMMUNICATIONS

CLAIM OF PRIORITY UNDER 35 U.S.C. § 119

The present application for patent claims priority to Provisional Application No. 62/454,517, entitled "COMMUNICATING CONTROL DATA BASED ON REFERENCE SIGNALS IN WIRELESS COMMUNICATIONS" filed Feb. 3, 2017, which is assigned to the assignee hereof and hereby expressly incorporated by reference herein for all purposes.

BACKGROUND

Aspects of the present disclosure relate generally to wireless communication systems, and more particularly, to communicating control data based on reference signals.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband (eMBB) addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

In URLLC, different short transmission time interval (sTTI) lengths may possibly be utilized, such as a two symbol sTTI (e.g., in a legacy subframe comprising 12 or 14 symbols), one slot sTTI (e.g., in a legacy subframe comprising two slots), etc. Due to the sTTI, using legacy reference signal mechanisms in URLLC may not always provide intended or expected results in performing channel estimation in wireless communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for communicating in wireless communications is provided. The method includes receiving, by a user equipment (UE), a configuration for communicating with a base station according to a first type of reference signal (RS) or a second type of RS, wherein the first type of RS and the second type of RS are transmitted by the base station to the UE in accordance with the configuration, receiving a downlink communication from the base station in accordance with the configuration, determining a timeline for transmitting an uplink communication corresponding to the downlink communication, wherein the timeline is associated with the first type of RS or the second type of RS, and sending the uplink communication to the base station based at least in part on the timeline.

In another example, an apparatus for communicating in wireless communications is provided. The apparatus includes a transceiver for communicating one or more wireless signals via at least the transmitter and one or more antennas, a memory configured to store instructions, and one or more processors communicatively coupled with the transceiver and the memory. The one or more processors are configured to receive a configuration for communicating with a base station according to a first type of RS or a second type of RS, wherein the first type of RS and the second type of RS are transmitted by the base station in accordance with the configuration, receive a downlink communication from the base station in accordance with the configuration, determine a timeline for transmitting an uplink communication corresponding to the downlink communication, wherein the timeline is associated with the first type of RS or the second type of RS, and send the uplink communication to the base station based at least in part on the timeline.

In another example, an apparatus for communicating in wireless communications is provided that includes means for receiving a configuration for communicating with a base station according to a first type of RS or a second type of RS, wherein the first type of RS and the second type of RS are transmitted by the base station in accordance with the configuration, means for receiving a downlink communication from the base station in accordance with the configuration, means for determining a timeline for transmitting an uplink communication corresponding to the downlink communication, wherein the timeline is associated with the first type of RS or the second type of RS, and means for sending the uplink communication to the base station based at least in part on the timeline.

In another example, a computer-readable medium, including code executable by one or more processors for communicating in wireless communications, is provided. The code includes code for receiving, by a UE, a configuration for communicating with a base station according to a first type of RS or a second type of RS, wherein the first type of RS and the second type of RS are transmitted by the base station to the UE in accordance with the configuration, code for receiving a downlink communication from the base station in accordance with the configuration, code for determining a timeline for transmitting an uplink communication corresponding to the downlink communication, wherein the timeline is associated with the first type of RS or the second type of RS, and code for sending the uplink communication to the base station based at least in part on the timeline.

In another example, a method for communicating in wireless communications is presented. The method includes determining whether a UE is to process a downlink communication based on a first type of RS or a second type of RS, determining a timeline for receiving an uplink communication corresponding to the downlink communication based at least in part on the determining whether the UE is configured to process the downlink communication based on the first type of RS or the second type of RS, and receiving the uplink communication from the UE based at least in part on the timeline.

In another example, an apparatus for communicating in wireless communications is provided that includes a transceiver for communicating one or more wireless signals via at least the transmitter and one or more antennas, a memory configured to store instructions, and one or more processors communicatively coupled with the transceiver and the memory. The one or more processors are configured to determine whether a UE is to process a downlink communication based on a first type of RS or a second type of RS, determine a timeline for receiving uplink communication corresponding to the downlink communication based at least in part on the determining whether the UE is configured to process the downlink communication based on the first type of RS or the second type of RS, and receive the uplink communication from the UE based at least in part on the timeline.

In another example, an apparatus for communicating in wireless communications is provided. The apparatus includes means for determining whether a UE is to process downlink communication based on a first type of RS or a second type of RS, means for determining a timeline for receiving uplink communication corresponding to the downlink communication based at least in part on the determining whether the UE is configured to process the downlink communication based on the first type of RS or the second type of RS, and means for receiving the uplink communication from the UE based at least in part on the timeline.

In another example, a computer-readable medium, including code executable by one or more processors for communicating in wireless communications, is provided. The code includes code for determining whether a UE is to process downlink communication based on a first type of RS or a second type of RS, code for determining a timeline for receiving uplink communication corresponding to the downlink communication based at least in part on the determining whether the UE is configured to process the downlink communication based on the first type of RS or the second type of RS, and code for receiving the uplink communication from the UE based at least in part on the timeline.

In another example, a method for processing control data communications is presented. The method includes receiving control data from a base station over a short transmission time interval (sTTI), determining a first hypothesis for processing the control data based on a RS transmitted in the sTTI, determining a second hypothesis for processing the control data based on a reference RS transmitted in a previous sTTI, and performing one or more processing attempts on the control data based on at least one of the first hypothesis or the second hypothesis.

In another example, a method for indicating one or more parameters for decoding control data communications is provided. The method includes transmitting first control data with a RS in a first sTTI, transmitting second control data without the RS in a second sTTI, and indicating, to a UE, the first sTTI as being a reference sTTI for processing the second control data in the second sTTI In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
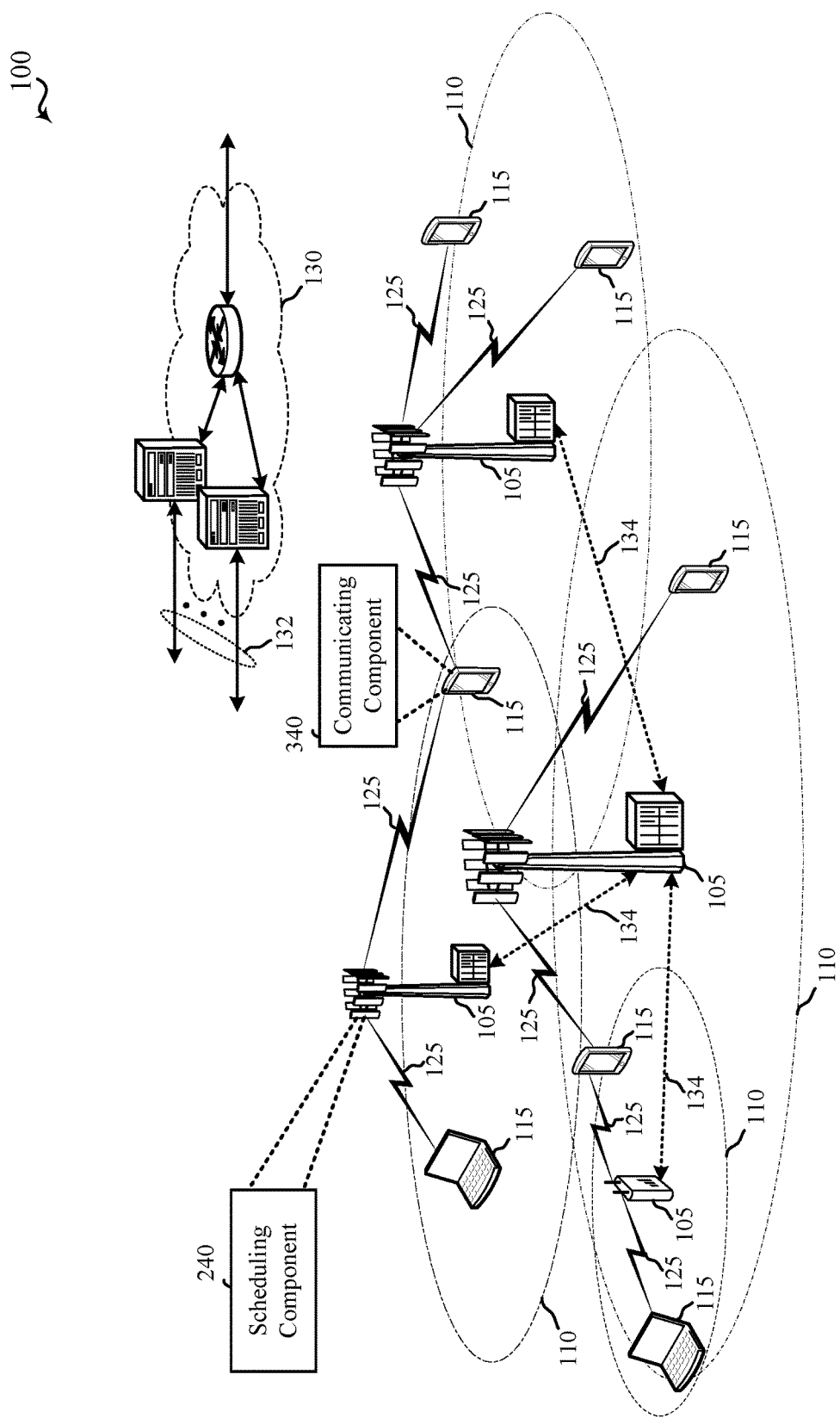
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to control data communications based on reference signals in low-latency wireless communications. For example, low-latency wireless communication technologies can be based on legacy wireless communication technologies, such as long term evolution (LTE), and may utilize a short transmission time interval (sTTI), such as one or two symbols (e.g., orthogonal frequency division multiplexing (OFDM) symbols, single carrier frequency division multiplexing (SC-FDM) symbols, etc.) of a subframe, a slot of a subframe, etc., where LTE uses a subframe TTI, which may include 12 or 14 OFDM or SC-FDM symbols over 2 slots (e.g., 6 or 7 symbols in each slot). Thus, in one example, the low-latency wireless communication technology can correspond to one or more fifth generation (5G) new radio (NR) technologies, such as enhanced mobile broadband (eMBB), ultra-reliable-low latency communications (URLLC), and/or the like. In addition, one or more reference signals (RSs), such as a cell-specific reference signal (CRS), demodulation reference signal (DM-RS), etc., can be used to process (e.g., decode, perform channel estimation for, etc.) control communications (e.g., short physical downlink control channel (sPDCCH), short physical uplink control channel (sPUCCH), etc.) and/or data communications (e.g., short physical downlink shared channel (sPDSCH), short physical uplink shared channel (sPUSCH), etc.), or other downlink or uplink data or related channels, in the low-latency wireless communication technology. For example, a type of RS used for processing may impact a timeline for providing feedback for the control or data communications. In another example, where DM-RS is used to process control data, additional functionality may be provided to determine which DM-RS is used, as in legacy LTE, DM-RS information may be specified in the control data.

Where CRS is used for processing the communications, for example, for either two symbol or one slot sTTI, sPDCCH and/or sPDSCH can rely on past and/or present CRS ports. Thus, it can be beneficial to front load control signaling in sTTI. For example, for a two symbol sTTI, sPDCCH can be within the first symbol, and/or for one slot sTTI, sPDCCH can be within the first symbol or the first two symbols. In one example, the entire bandwidth can be split into a set of blocks (each block including multiple physical resource blocks (PRBs)). Within each block of a two symbol sTTI, a region can be assigned to sending the control information.

Where DM-RS is used for processing the communications, for example, DM-RS ports may be restricted to a first symbol (e.g., in two symbol or one slot sTTI) with an orthogonal cover code (OCC) used for multiplexing DM-RSs. In another example, the DM-RS ports may be frequency division multiplexed (FDM) over the first symbol. In either case, for example, closed-loop precoding may be inefficient as grants of possibly different users are located in the control region. For open-loop precoding, in either example, the DM-RS may be obtained in the first symbol and used to process a data channel over the same frequency region of the second (and/or subsequent) symbol(s). In yet another example, a pattern similar to legacy LTE DM-RS, where DM-RS is transmitted over multiple symbols (e.g., symbols 5, 6, 12, and 13 in a subframe) can be used. In this example, DM-RS ports can similarly be spanned over multiple symbols, but the symbols in this example may be limited to a lesser number of symbols in a sTTI (e.g., both symbols in a two symbol sTTI, two or more symbols of a one slot sTTI, etc. Also, in this example, control data can be communicated over the lesser number of symbols as well (e.g., downlink grants over the first symbol and uplink grants over the second symbol) and/or no control and data multiplexing may occur over control PRBs. Moreover, in this example, it can be assumed that a maximum number of resource elements (REs) can be assigned to DM-RS transmission. In an example, the number or REs (e.g., or an indication to use a maximum number of REs) may be specified in a configuration, and/or the number of layers/ports/scrambling information can be indicated to the UE. The identified layers/ports/scrambling information can be used for decoding control data, and once the control data is decoded, the DM-RS information for decoding data can be obtained.

Where, as in examples above, DM-RS is transmitted over the first two symbols, processing sPDCCH based on DM-RS can require more time than processing sPDCCH based on CRS. Similarly, for example, processing sPDCCH based on a CRS (or other RS) transmitted over two symbols may require more time than processing sPDCCH based on a CRS (or other RS) transmitted over one symbol. Thus, for example, a HARQ timeline can be modified based on whether sPDCCH is processed using CRS or DM-RS (e.g., DM-RS-based processing can use a longer HARQ timeline than CRS-based processing). In another example, selection of whether CRS or DM-RS is used, and/or an associated HARQ timeline, can be based on a timing advance (TA) used in communications. In other examples, selecting of the timeline and/or TA value can be based on the type of RS (e.g., whether CRS-based processing (e.g., over one symbol or two symbols) or DM-RS-based processing of the sPDCCH is configured). Additionally, in an example, DM-RS can be used to process control data, and in this example, the received control data can be blind decoded based on multiple hypotheses, such as a first hypothesis that a DM-RS is sent in the sTTI, and/or a second hypothesis that DM-RS is not sent in the sTTI (in which case the UE can use one or more previously sent DM-RSs). In this example, open-loop or closed-loop precoding of the control data can be used, as described in further detail herein.

The described features will be presented in more detail below with reference to FIGS. 1-8.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 illustrates an example of a wireless communication system 100 in accordance with various aspects of the present disclosure. The wireless communication system 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X2, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a network entity, a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may be or include a Long Term Evolution (LTE) or LTE-Advanced (LTE-A) network. The wireless communication system 100 may also be a next generation network, such as a 5G wireless communication network. In LTE/LTE-A networks, the term evolved node B (eNB), gNB, etc. may be generally used to describe the base stations 105, while the term UE may be generally used to describe the UEs 115. The wireless communication system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs 115 with service subscriptions with the network provider.

A small cell may include a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB, gNB, etc. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A packet data convergence protocol (PDCP) layer can provide header compression, ciphering, integrity protection, etc. of IP packets. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or the like. A UE may be able to communicate with various types of base stations and network equipment including macro eNBs, small cell eNBs, relay base stations, and the like.

The communication links 125 shown in wireless communication system 100 may carry uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In aspects of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In an example, a base station 105 may include a scheduling component 240 for scheduling resources to one or more UEs 115 to facilitate wireless communications with the UE 115, and the UE 115 may include a communicating component 340 for receiving the resource scheduling and accordingly communicate with the base station 105 over the resources. Scheduling component 240, for example, may be configured to transmit one or more RSs to allow the UE 115 to process (e.g., demodulate, perform channel estimation on, or otherwise decode) communications from the base station 105, and/or may configure additional communication parameters based on a type of RS, such as a timeline for receiving feedback from the UE 115, a rate matching indication, a reference sTTI with the RS for processing communications in another sTTI, etc. Communicating component 340, for example, may be configured to determine a type of one or more RSs received from a base station 105 for processing communications therefrom, and/or can accordingly determine one or more additional communication parameters based on a type of RS. Similarly, for example, the one or more additional communication parameters may include a feedback timeline, a rate matching indication, a reference sTTI, etc.

In another example, communicating component 340 may perform blind decoding of communications from the base station 105 based on one or more hypotheses regarding when a corresponding RS is received. Additionally, though generally described in terms of the UE receiving the RS and associated downlink communications, similar concepts can be employed by the UE 115 in transmitting an RS and associated uplink communications (and can be employed by the base station 105 in receiving the uplink RS and uplink communications).

Turning now to FIGS. 2-8, aspects are depicted with reference to one or more components and one or more methods that may perform the actions or operations described herein, where aspects in dashed line may be optional. Although the operations described below in FIGS. 4-7 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
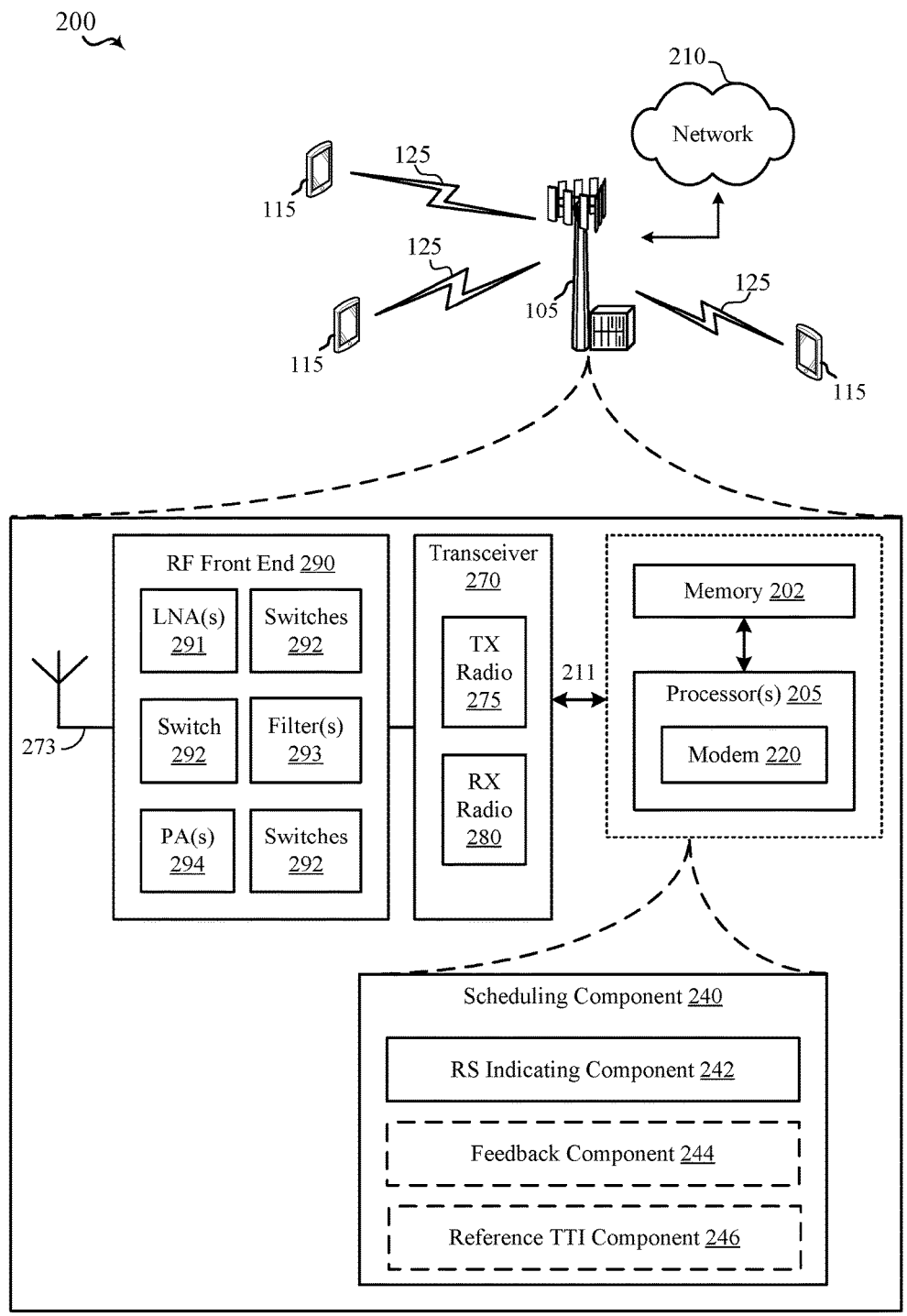
FIG. 2 is a block diagram illustrating an example of a base station, in accordance with various aspects of the present disclosure.

Referring to FIG. 2, a block diagram 200 is shown that includes a portion of a wireless communications system having multiple UEs 115 in communication with a base station 105 via communication links 125, where the base station 105 is also connected to a network 210. The UEs 115 may be examples of the UEs described in the present disclosure that are configured to receive RSs from a base station 105 for processing other communications. Moreover the base station 105 may be an example of the base stations described in the present disclosure (e.g., eNB, gNB, etc.) that are configured to communicate RSs to one or more UEs 115 for processing communications.

In an aspect, the base station in FIG. 2 may include one or more processors 205 and/or memory 202 that may operate in combination with a scheduling component 240 to perform the functions, methodologies (e.g., method 500 of FIG. 5, method 700 of FIG. 7, etc.), or methods presented in the present disclosure. In accordance with the present disclosure, the scheduling component 240 may include a RS indicating component 242 to communicate one or more RSs and/or indicating a type of the one or more RSs to one or more UEs 115, an optional feedback component 244 to determine a feedback timeline and/or receive feedback from the one or more UEs 115 based on the type of the one or more RSs, and/or an optional reference TTI component 246 to indicate a reference sTTI having a RS to be used in processing communications from the base station 105.

The one or more processors 205 may include a modem 220 that uses one or more modem processors. The various functions related to the scheduling component 240, and/or its sub-components, may be included in modem 220 and/or processor 205 and, in an aspect, can be executed by a single processor, while in other aspects, different ones of the functions may be executed by a combination of two or more different processors. For example, in an aspect, the one or more processors 205 may include any one or any combination of a modem processor, or a baseband processor, or a digital signal processor, or a transmit processor, or a transceiver processor associated with transceiver 270, or a system-on-chip (SoC). In particular, the one or more processors 205 may execute functions and components included in the scheduling component 240.

In some examples, the scheduling component 240 and each of the sub-components may comprise hardware, firmware, and/or software and may be configured to execute code or perform instructions stored in a memory (e.g., a computer-readable storage medium, such as memory 202 discussed below). Moreover, in an aspect, the base station 105 in FIG. 2 may include a radio frequency (RF) front end 290 and transceiver 270 for receiving and transmitting radio transmissions to, for example, UEs 115. The transceiver 270 may coordinate with the modem 220 to receive signals for, or transmit signals generated by, the scheduling component 240 to the UEs. RF front end 290 may be connected to one or more antennas 273 and can include one or more switches 292, one or more amplifiers (e.g., power amplifiers (PAs) 294 and/or low-noise amplifiers 291), and one or more filters 293 for transmitting and receiving RF signals on uplink channels and downlink channels. In an aspect, the components of the RF front end 290 can be communicatively coupled with transceiver 270. The transceiver 270 may be communicatively coupled with the one or more of modem 220 and processors 205.

The transceiver 270 may be configured to transmit (e.g., via transmitter (TX) radio 275) and receive (e.g., via receiver (RX) radio 280) wireless signals through antennas 273 via the RF front end 290. In an aspect, the transceiver 270 may be tuned to operate at specified frequencies such that the base station 105 can communicate with, for example, UEs 115. In an aspect, for example, the modem 220 can configure the transceiver 270 to operate at a specified frequency and power level based on the configuration of the base station 105 and communication protocol used by the modem 220.

The base station 105 in FIG. 2 may further include a memory 202, such as for storing data used herein and/or local versions of applications or scheduling component 240 and/or one or more of its sub-components being executed by processor 205. Memory 202 can include any type of computer-readable medium usable by a computer or processor 205, such as random access memory (RAM), read only memory (ROM), tapes, magnetic discs, optical discs, volatile memory, non-volatile memory, and any combination thereof. In an aspect, for example, memory 202 may be a computer-readable storage medium that stores one or more computer-executable codes defining scheduling component 240 and/or one or more of its sub-components. Additionally or alternatively, the base station 105 may include a bus 211 for communicatively coupling one or more of the RF front end 290, the transceiver 274, the memory 202, or the processor 205, and to exchange signaling information between each of the components and/or sub-components of the base station 105.

In an aspect, the processor(s) 205 may correspond to one or more of the processors described in connection with the base station in FIG. 8. Similarly, the memory 202 may correspond to the memory described in connection with the base station in FIG. 8.

Figure 3:
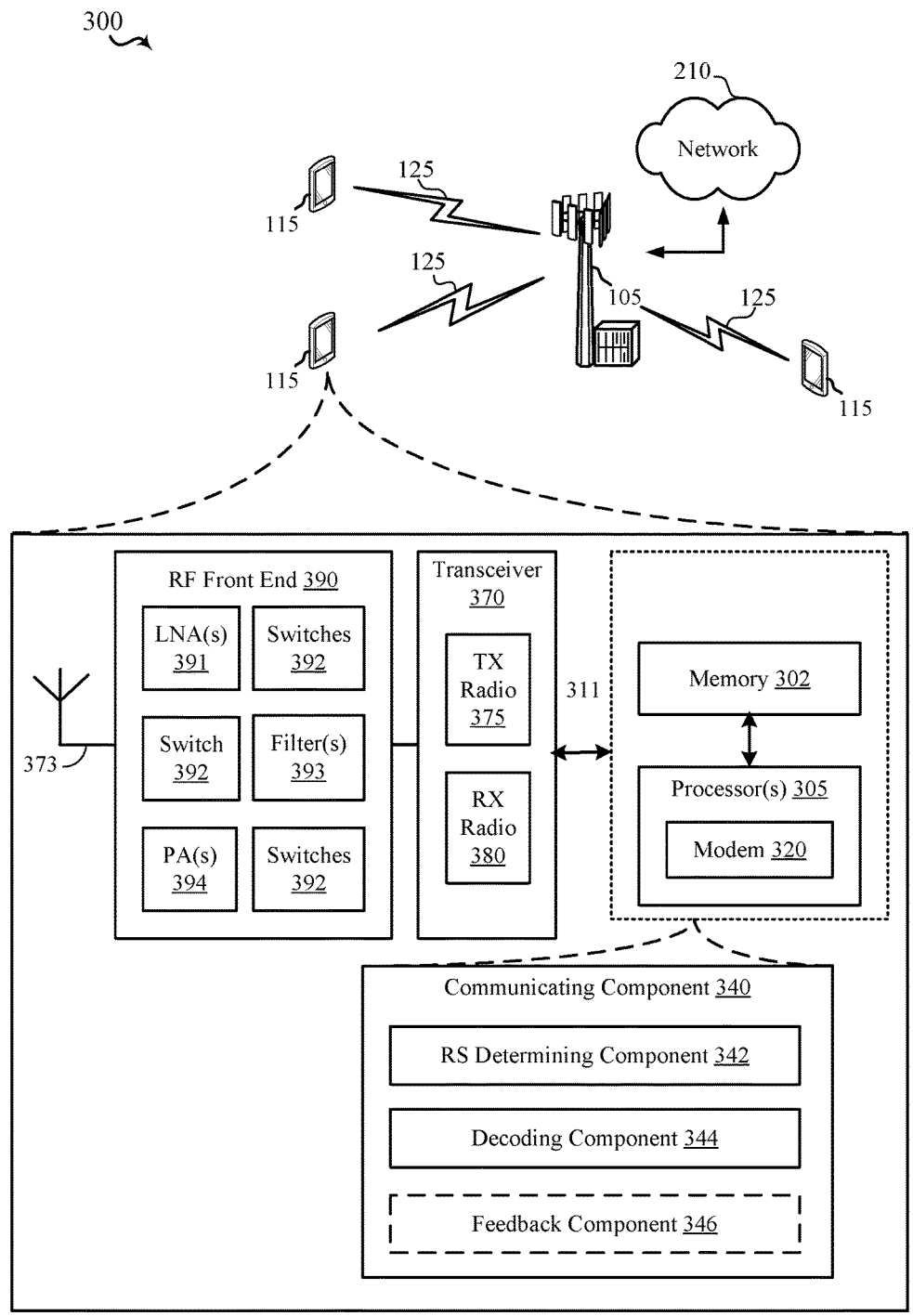
FIG. 3 is a block diagram illustrating an example of a UE, in accordance with various aspects of the present disclosure.

Referring to FIG. 3, a block diagram 300 is shown that includes a portion of a wireless communications system having multiple UEs 115 in communication with a base station 105 via communication links 125, where the base station 105 is also connected to a network 210. The UEs 115 may be examples of the UEs described in the present disclosure that are configured to receive RSs from a base station 105 for processing other communications. Moreover the base station 105 may be an example of the base stations described in the present disclosure (e.g., eNB, gNB, etc.) that are configured to communicate RSs to one or more UEs 115 for processing communications.

In an aspect, the UE 115 in FIG. 3 may include one or more processors 305 and/or memory 302 that may operate in combination with a communicating component 340 to perform the functions, methodologies (e.g., method 400 of FIG. 4, method 600 of FIG. 6), or methods presented in the present disclosure. In accordance with the present disclosure, the communicating component 340 may include a RS determining component 342 to determine a type of one or more RSs transmitted by a base station 105, a decoding component 344 to decode communications from the base station 105 based on the type of the one or more RSs, and/or an optional feedback component 346 to communicate feedback according to a timeline based on the type of the one or more RSs.

The one or more processors 305 may include a modem 320 that uses one or more modem processors. The various functions related to the communicating component 340, and/or its sub-components, may be included in modem 320 and/or processor 305 and, in an aspect, can be executed by a single processor, while in other aspects, different ones of the functions may be executed by a combination of two or more different processors. For example, in an aspect, the one or more processors 305 may include any one or any combination of a modem processor, or a baseband processor, or a digital signal processor, or a transmit processor, or a transceiver processor associated with transceiver 370, or a system-on-chip (SoC). In particular, the one or more processors 305 may execute functions and components included in the communicating component 340.

In some examples, the communicating component 340 and each of the sub-components may comprise hardware, firmware, and/or software and may be configured to execute code or perform instructions stored in a memory (e.g., a computer-readable storage medium, such as memory 302 discussed below). Moreover, in an aspect, the UE 115 in FIG. 3 may include an RF front end 390 and transceiver 370 for receiving and transmitting radio transmissions to, for example, base stations 105. The transceiver 370 may coordinate with the modem 320 to receive signals that include the packets as received by the communicating component 340. RF front end 390 may be connected to one or more antennas 373 and can include one or more switches 392, one or more amplifiers (e.g., PAs 394 and/or LNAs 391), and one or more filters 393 for transmitting and receiving RF signals on uplink channels and downlink channels. In an aspect, the components of the RF front end 390 can be communicatively coupled with transceiver 370. The transceiver 370 may be communicatively coupled with one or more of modem 320 and processors 305.

The transceiver 370 may be configured to transmit (e.g., via transmitter (TX) radio 375) and receive (e.g., via receiver (RX) radio 380) wireless signals through antennas 373 via the RF front end 390. In an aspect, the transceiver 370 may be tuned to operate at specified frequencies such that the UE 115 can communicate with, for example, base stations 105. In an aspect, for example, the modem 320 can configure the transceiver 370 to operate at a specified frequency and power level based on the configuration of the UE 115 and communication protocol used by the modem 320.

The UE 115 in FIG. 3 may further include a memory 302, such as for storing data used herein and/or local versions of applications or communicating component 340 and/or one or more of its sub-components being executed by processor 305. Memory 302 can include any type of computer-readable medium usable by a computer or processor 305, such as RAM, ROM, tapes, magnetic discs, optical discs, volatile memory, non-volatile memory, and any combination thereof. In an aspect, for example, memory 302 may be a computer-readable storage medium that stores one or more computer-executable codes defining communicating component 340 and/or one or more of its sub-components. Additionally or alternatively, the UE 115 may include a bus 311 for communicatively coupling one or more of the RF front end 390, the transceiver 374, the memory 302, or the processor 305, and to exchange signaling information between each of the components and/or sub-components of the UE 115.

In an aspect, the processor(s) 305 may correspond to one or more of the processors described in connection with the UE in FIG. 8. Similarly, the memory 302 may correspond to the memory described in connection with the UE in FIG. 8.

Figure 4:
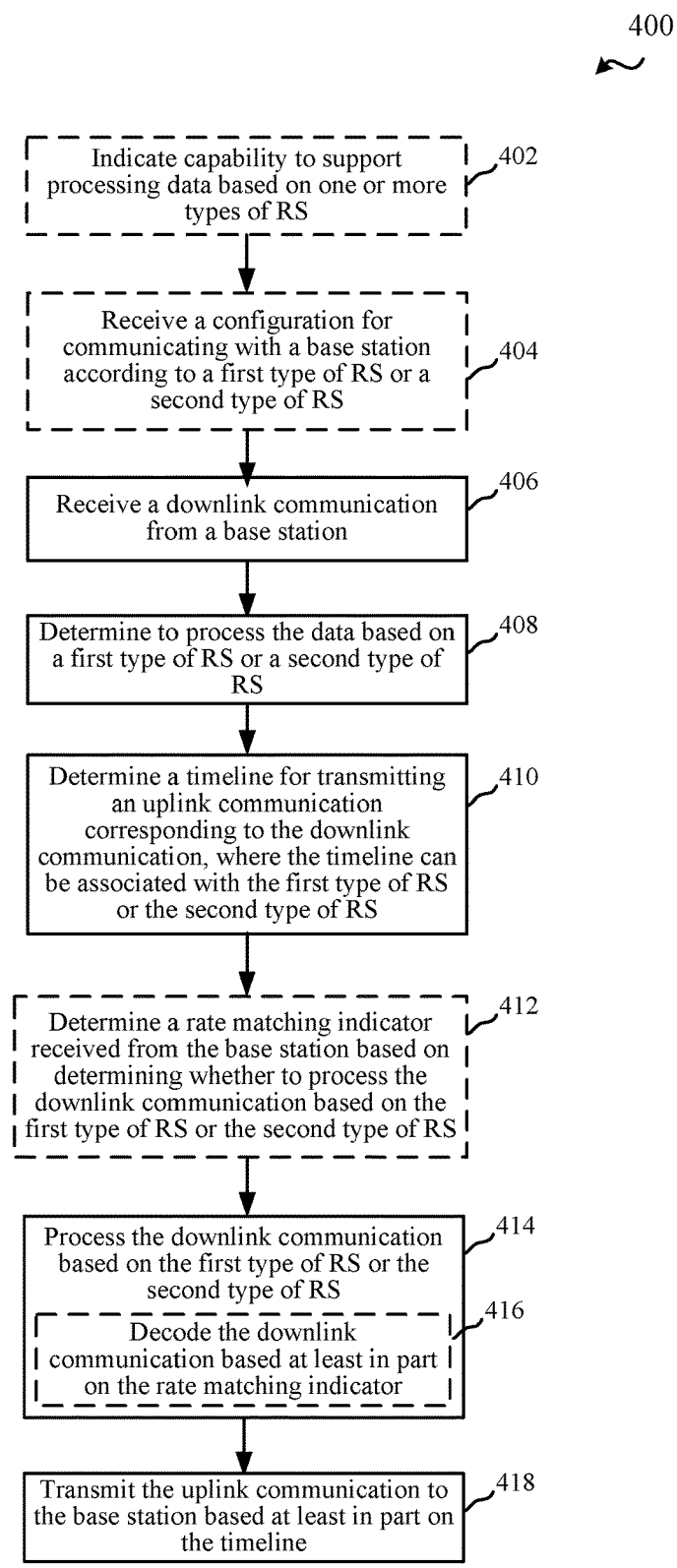
FIG. 4 is a flow chart illustrating an example of a method for transmitting feedback, in accordance with various aspects of the present disclosure.

FIG. 4 illustrates a flow chart of an example of a method 400 for transmitting (e.g., by a UE) uplink communications based on one or more received RSs.

In method 400, optionally at Block 402, the UE can indicate a capability to support processing data based on one or more types of RS. In an aspect, communicating component 340, e.g., in conjunction with processor(s) 305, memory 302, and/or transceiver 370, can indicate the capability to support processing data based on the one or more types of RS. For example, communicating component 340 can transmit, to the base station 105, an indication of the capability over an uplink channel, such as sPUCCH, sPUSCH, etc. In one example, the indication may be an explicit indication, another indication from which the capability can be derived (e.g., a version of a radio of the UE 115), etc. Additionally, the capability may correspond to whether the UE supports processing data based on a CRS (e.g., transmitted over one symbol or two symbols, etc.) and/or a DM-RS. In any case, for example, the base station 105 may use the indication to determine whether to communicate the data based on a CRS or DM-RS transmitted by the base station 105, as described further herein.

Optionally at Block 404, the UE can receive a configuration for communicating with a base station according to a first type of RS or a second type of RS. In an aspect, communicating component 340, e.g., in conjunction with processor(s) 305, memory 302, and/or transceiver 370, can receive the configuration (e.g., from the base station 105, memory 302, etc.) for communicating with the base station 105 according to the first type of RS or the second type of RS. For example, communicating component 340 can receive the configuration, which may indicate to process communications from the base station 105 based on a certain type of RS, such as a CRS (e.g., a one-symbol or two-symbol CRS), a DM-RS, and/or the like. As described herein, a timeline for communicating feedback for data processed based on the certain type of RS can also correspond to the type of RS. For example, a longer timeline can be selected for a reference signal that is longer in duration, etc., as described herein. Moreover, as described herein, communicating component 340 can receive this configuration from the base station 105 in broadcast signaling, higher layer signaling, such as radio resource control (RRC) signaling, etc.

At Block 406, the UE can receive a downlink communication from a base station. In an aspect, communicating component 340, e.g., in conjunction with processor(s) 305, memory 302, and/or transceiver 370, can receive the downlink communication from the base station (e.g., base station 105, over a shared data channel (e.g., sPDSCH) or control channel (e.g., sPDCCH)). For example, communicating component 340 can receive the downlink communication over the shared data channel in one or more symbols of a sTTI defined for communicating with the base station 105. For example, the sTTI may have a duration of two symbols, one slot, etc. of a subframe, and communicating component 340 may receive the downlink communication over the first symbol, second symbol, one or more subsequent symbols, etc. In one example, the downlink communication can relate to, and can be scheduled for, one or more 5G NR technologies, such as eMBB, URLLC, etc.

At Block 408, the UE can determine to process the downlink communication based on a first type of RS or a second type of RS. In an aspect, RS determining component 342, e.g., in conjunction with processor(s) 305, memory 302, transceiver 370, and/or communicating component 340, can determine to process the downlink communication based on the first type of RS or the second type of RS. For example, RS determining component 342 can determine a first type of RS or second type of RS received from the base station 105 (e.g., in a same sTTI or previous sTTI as the data), and may determine to use the first type of RS or second type of RS to process (e.g., demodulate, perform channel estimation on, or otherwise decode) the downlink communication. In one example, RS determining component 342 may receive an indicator or configuration (e.g., as described with respect to Block 404 above) from the base station 105 (e.g., in broadcast signaling, higher layer signaling, such as radio resource control (RRC) signaling, etc.) indicating whether to process downlink communication using the first type of RS or the second type of RS. In another example, RS determining component 342 may determine the type of RS received from the base station 105 (e.g., based on contents of the RS, resources over which the RS is received, etc.). In another example, RS determining component 342 may determine the type of RS as based on the capability indicated by the communicating component 340 (e.g., as described in reference to Block 402, above). For example, the first type of RS may correspond to CRS and/or the second type of RS may correspond to DM-RS. In another example, one or more types of RS can correspond to a number of symbols used to transmit the RS (e.g., a first type for a CRS transmitted in one symbol, a second type for a CRS transmitted in two symbols, etc.).

At Block 410, the UE can determine a timeline for transmitting an uplink communication corresponding to the downlink communication, where the timeline can be associated with the first type of RS or the second type of RS. In an aspect, feedback component 346, e.g., in conjunction with processor(s) 305, memory 302, transceiver 370, and/or communicating component 340, can determine the timeline for transmitting the uplink communication corresponding to the downlink communication, where the timeline can be associated with the first type of RS or the second type of RS. As described, for example, the timeline can be associated with the type of the one or more RSs, and processing data based on DM-RS may require additional time over processing data based on CRS, as the DM-RS may be transmitted over two symbols whereas the CRS may be transmitted over a first symbol in a given sTTI. In addition, in other words for example, the base station 105 may transmit sPDCCH over the first symbol of the sTTI if CRS-based sPDSCH (e.g., at least for one-symbol CRS) is configured, or may transmit sPDCCH over the first two symbols of the sTTI if DM-RS-based sPDSCH (or two-symbol CRS) is configured. In another example, the base station 105 may transmit sPD-CCH over the first two symbols where CRS-based sPDSCH is configured (e.g., which may be for 1 slot sTTI). In any case, the timeline may also be based on a number of symbols used in transmitting the RS.

In this regard, for example, feedback component 346 can determine the feedback timeline (e.g., for transmitting hybrid automatic repeat/request (HARD) feedback), as the feedback timeline may be tied to, or may otherwise relate to, the type of the RS based on which the downlink communication is transmitted by the base station 105. For instance, feedback component 346 can determine a first offset for transmitting the uplink communication corresponding to the downlink communication received from the base station, where the first offset can correspond to the first type of RS, or can determine a second offset for transmitting the uplink communication corresponding to the downlink communication received from the base station, where the second offset can correspond to the second type of RS. For example, an offset can be an indication of a number of symbols from the symbol including the received data, where the uplink communication is transmitted at the symbol corresponding to the offset. As an example, where the uplink communication relates to transmitting feedback for the downlink communication, if CRS-based sPDSCH is configured, the feedback timing (also referred to herein as the HARQ timing) can be n+k_1 (e.g., the first offset), where n can be an index of a symbol over which the communications for providing feedback are received, while when DMRS-based sPDSCH is configured, the HARQ timing can be n+k_2 (e.g., the second offset), where k_2≥k_1.

In another example, feedback component 346 can determine the timeline for transmitting the uplink communication based additionally on a timing advance (TA) used in communicating with the base station 105, as described with respect to FIG. 5 below. For example, different timelines for transmitting the uplink communication can be based on the TA and/or based on the type of RS used to process the downlink communication. In an example, feedback component 244 can determine a first timeline for communicating HARQ feedback, as the uplink communication, for a first TA and using CRS to process the downlink communication, a second timeline for communicating HARQ feedback for the first TA and using DM-RS to process the downlink communication, a third timeline for communicating HARQ feedback for a second TA and using CRS to process the downlink communication, a fourth timeline for HARQ feedback for the second TA and using DM-RS to process the downlink communication, etc. In one example, communicating component 340 can receive the TA value from the base station 105 in other communications with the base station 105. In another example, feedback component 346 may receive, from the base station 105, one or more parameters indicating the feedback timeline.

At Block 412, the UE can optionally determine a rate matching indicator received from the base station based on determining whether to process the downlink communication based on the first type of RS or the second type of RS. In an aspect, communicating component 340, e.g., in conjunction with processor(s) 305, memory 302, and/or transceiver 370, can determine the rate matching indicator received from the base station (e.g., base station 105) based on determining whether to process the downlink communication based on the first type of RS or the second type of RS.

Generally, for example, a rate matching indicator can be included in a downlink grant within a control region of one or more RBs to indicate which sPDCCH resources are not used (and thus can be used for sPDSCH transmission). In one example, the downlink grant can be located at the beginning of the sPDCCH region, and uplink grants can be located at the end of this region. In any case, the UE scheduled over a sTTI RB in the downlink can decode its downlink grant, via communicating component 340, and can accordingly obtain the rate matching indicator. The rate matching indicator indicates which resources are used for sending the uplink grants. Using this indicator, the UE 115 can know which resources are not used for control, and instead, used for sPDSCH (e.g., based on determining resources allocated for downlink communications that are not indicated by the rate matching indicator).

In this example, communicating component 340 may determine the rate matching indicator is based on determining whether to process the downlink communication based on the first type of RS or the second type of RS. For example, where RS determining component 342 determines that a DM-RS is used to process the communications from the base station 105 (e.g., such that two symbols are used for control, such as the downlink grant over the first symbol, and the uplink grants over the second symbol), the rate-matching indicator may be a one bit indicator to indicate to the UE 115 whether any uplink grants are present over the second symbol or not. In another example, in this regard, the rate matching indicator may be an x bit indicator, where x is a positive integer, to indicate to the UE 115 which segments of the second symbol are used for uplink grant transmission (e.g., where the segments can be indexed sequentially based on a known amount of resources—e.g., REs—per segment, etc., and x can be a map indicating which segment indices are used for downlink control transmission). In another example, both the first symbol and second symbol in the sTTI (e.g., and/or additional symbols where the sTTI is greater than two symbols in duration) can be used for downlink and uplink grants. In this example, the rate matching indicator may be a one bit indicator indicating whether the first symbol and second symbol include downlink control transmissions, a two bit indicator respectively indicating whether the first symbol or the second symbol include uplink grant transmissions, an x bit indicator, where x is a positive integer, to indicate to the UE 115 which segments of the first symbol and/or the second symbol are used for downlink control transmission, etc.

At Block 414, the UE can process the downlink communication based on the first type of RS or the second type of RS. In an aspect, decoding component 344, e.g., in conjunction with processor(s) 305, memory 302, transceiver 370, and/or communicating component 340, can process the downlink communication based on the first type of RS or the second type of RS. As described, the type of RS to use in processing the downlink communication can be indicated to the UE 115 by the base station 105. Moreover, for example, decoding component 344 can process the downlink communication by obtaining the RS that is of the determined type, and at least one of demodulating the downlink communication based on the RS, performing channel estimation for a channel corresponding to the downlink communication based on the RS, or otherwise decoding the downlink communication based on the RS, etc. In one example, in processing the downlink communication at Block 414, the UE can optionally, at Block 416, decode the downlink communication based at least in part on the rate matching indicator (e.g., where the rate matching indicator is determined at Block 412). In an aspect, decoding component 344, e.g., in conjunction with processor(s) 305, memory 302, transceiver 370, and/or communicating component 340, can decode the downlink communication based at least in part on the rate matching indicator. For example, decoding component 344 can decode the downlink communication based on rate matching around the symbols based on the presence or absence of uplink or downlink grants, or otherwise determining the data region to not include one or more RBs used for the uplink or downlink grants, as indicated by the rate matching indicator.

At Block 418, the UE can transmit the uplink communication to the base station based at least in part on the timeline. In an aspect, communicating component 340, e.g., in conjunction with processor(s) 305, memory 302, and/or transceiver 370, can transmit the uplink communication to the base station (e.g., base station 105) based at least in part on the timeline. For example, communicating component 340 can determine the uplink communication as feedback based on whether the downlink communication can be processed, decoded, etc., based on one or more performance metrics or parameters related to receiving the data, and/or the like, and can transmit the uplink communication at the first or second offset depending on whether the first or second type of RS is received and/or is indicated for processing data received from the base station 105, used by the UE 115 in processing the data received from the base station 105, etc. For example, the feedback may include HARQ feedback (e.g., acknowledgement (ACK) or negative-ACK (NACK) corresponding to receiving the data), channel quality indicator (CQI), precoding matrix indicator (PMI), etc.

Figure 5:
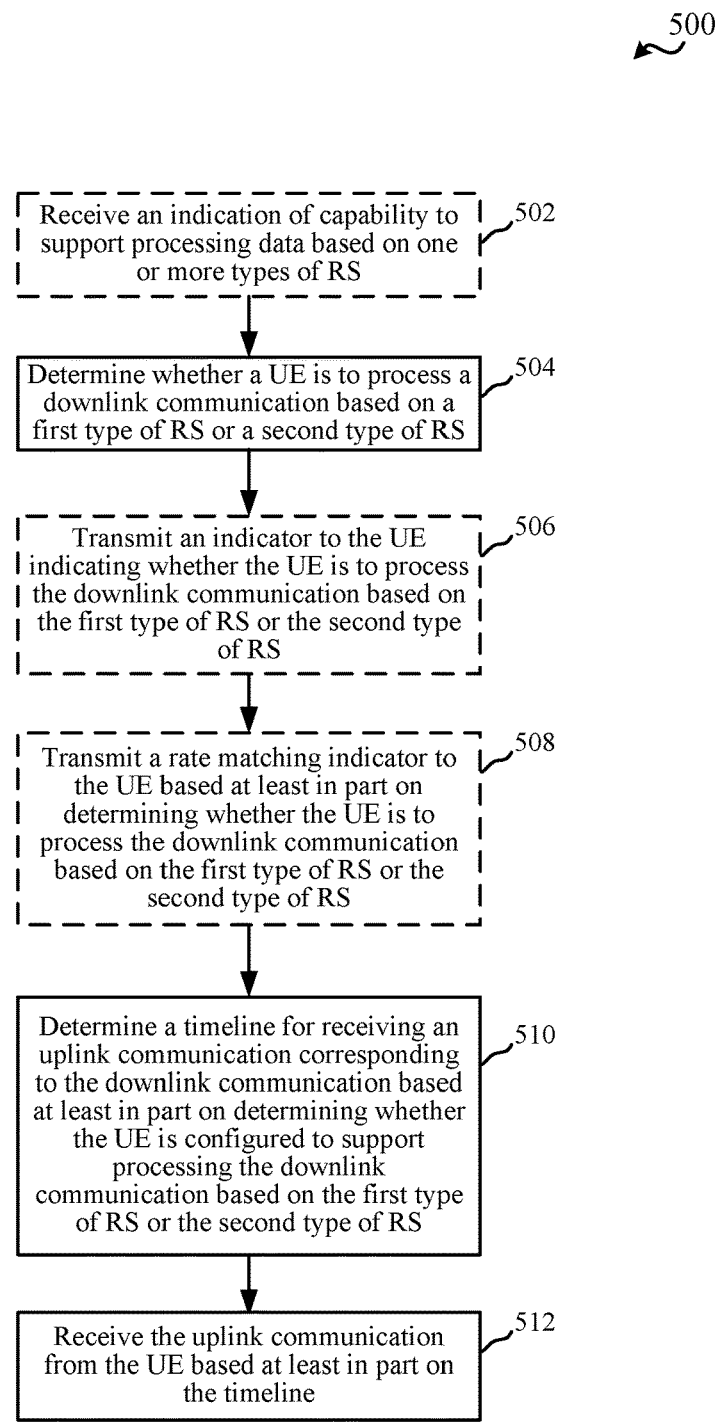
FIG. 5 is a flow chart illustrating an example of a method for receiving feedback, in accordance with various aspects of the present disclosure.

FIG. 5 illustrates a flow chart of an example of a method 500 for receiving (e.g., by a base station) uplink communications from a UE based on a RS used to process communications from the base station.

In method 500, optionally at Block 502, the base station can receive an indication of capability to support processing downlink communication based one or more types of RS. In an aspect, scheduling component 240, e.g., in conjunction with processor(s) 205, memory 202, and/or transceiver 270, can receive (e.g., from a UE 115) the indication of capability to support processing downlink communication based on one or more types of RS, or a number of symbols used to transmit the RS (e.g., a one-symbol CRS, two-symbol CRS, DM-RS, etc.). For example, scheduling component 240 can receive the indication from the UE 115 over control channel communications (e.g., over a sPUCCH) or other uplink communications (e.g., over a sPUSCH), etc., and the indication may indicate a capability of the UE 115 to support processing downlink communication based on a CRS and/or a DM-RS.

At Block 504, the base station can determine whether a UE is to process downlink communication based on a first type of RS or a second type of RS. In an aspect, RS indicating component 242, e.g., in conjunction with processor(s) 205, memory 202, transceiver 270, and/or scheduling component 240, can determine whether the UE (e.g., UE 115) is to process downlink communication based on the first type of RS or the second type of RS. In one example, RS indicating component 242 can determine to use the first type of RS or the second type of RS (e.g., a CRS, DM-RS, etc.) based on the indication of capability received from the UE 115 (e.g., as described in reference to Block 502 above). In an example, RS indicating component 242 may configure the UE 115 for processing communications using a certain type of RS where the type of RS can be based on a timing advance (TA) used by the base station 105 in communicating with the UE 115 (and/or the TA can be based on the determined type of RS). In one example, RS indicating component 242 can configure the UE 115 to process communications based on DM-RS (or two-symbol CRS) where the TA value is below a threshold, or can configure the UE 115 to process communications based on CRS where the TA is above the threshold (or another threshold).

At Block 506, the base station can optionally transmit an indicator to the UE indicating whether the UE is to process the downlink communication based on the first type of RS or the second type of RS. In an aspect, RS indicating component 242, e.g., in conjunction with processor(s) 205, memory 202, transceiver 270, and/or scheduling component 240, can transmit the indicator to the UE (e.g., UE 115) indicating whether the UE is to process the downlink communication based on the first type of RS or the second type of RS. For example, RS indicating component 242 may signal whether a first type of RS or second type of RS is to be used in processing communications from the base station 105 via broadcast signaling, such as in one or more master information blocks (MIBs), system information blocks (SIBs), etc., higher layer signaling, such as RRC signaling, in a dedicated control channel (e.g., sPDCCH) or data channel (e.g., sPDSCH), etc.

At Block 508, the base station may optionally transmit a rate matching indicator to the UE based at least in part on determining whether the UE is to process the downlink communication based on the first type of RS or the second type of RS. In an aspect, scheduling component 240, e.g., in conjunction with processor(s) 205, memory 202, and/or transceiver 270, can transmit the rate matching indicator to the UE (e.g., UE 115) based at least in part on determining whether the UE is to process the downlink communication based on the first type of RS or the second type of RS (e.g., where rate matching indicators are used). For example, as described, where the UE is to use DM-RS based processing, scheduling component 240 can transmit the rate matching indicator to indicate whether a second symbol (or subsequent symbols) in the sTTI includes uplink grants, which resources are used in the second symbol (or subsequent symbols) for uplink grants, etc. to allow the UE 115 to rate match around the resources.

At Block 510, the base station can determine a timeline for receiving an uplink communication corresponding to the downlink communication based at least in part on determining whether the UE is configured to support processing the downlink communication based on the first type of RS or the second type of RS. In an aspect, feedback component 244, e.g., in conjunction with processor(s) 205, memory 202, transceiver 270, and/or scheduling component 240, can determine the timeline for receiving the uplink communication corresponding to the downlink communication based at least in part on determining whether the UE (e.g., UE 115)

is configured to support processing the downlink communication based on the first type of RS or the second type of RS. As described, for example, feedback component 244 may determine the timeline by applying an offset to a symbol over which the downlink communication, to which the uplink communication relates, is transmitted. The offset can correspond to the type of RS. In a specific example, as described, feedback component 244 can determine the offset to be a first offset where the UE is configured to support processing the downlink communication based on CRS (e.g., $k\_1$) or a second offset where the UE is configured to support processing the downlink communication based on DM-RS (e.g., $k\_2$, where $k\_2 \geq k\_1$).

In another example, feedback component 244 (or feedback component 346 of the UE 115) can determine the timeline for uplink communication based on the TA, described above. For example, if the TA value is below a threshold, RS indicating component 242 can configure CRS-based processing, and feedback component 244 can determine the offset as $k\_1$ based on the TA and CRS configuration, or RS indicating component 242 can configure DMRS-based processing, and feedback component 244 can determine the offset as $k\_2$ based on the TA and DM-RS configuration, where $k\_2 \geq k\_1$. In another example, if the TA value is above the threshold (or a different threshold), RS indicating component 242 can configure CRS-based processing, and feedback component 244 can determine the offset as $k\_3$ based on the TA and CRS configuration, or RS indicating component 242 can configure DMRS-based processing, and feedback component 244 can determine the offset as $k\_4$ based on the TA and DM-RS configuration, where $k\_4 \geq k\_3$, and where $k\_3 \geq k\_1$ and $k\_4 \geq k\_2$. In one example, scheduling component 240 may indicate the TA to the UE 115 (e.g., in other communications related to the base station 105 and UE 115). In another example, feedback component 244 may indicate one or more parameters regarding the timeline to the UE 115 to allow the UE 115 to transmit the uplink communication, e.g., which may include feedback for the downlink communication, based on the timeline (e.g., where the UE 115 does not otherwise determine the timeline based on the other parameters/considerations described above).

At Block 512, the base station can receive the uplink communication from the UE based at least in part on the timeline. In an aspect, feedback component 244, e.g., in conjunction with processor(s) 205, memory 202, transceiver 270, and/or scheduling component 240, can receive the uplink communication from the UE based at least in part on the timeline. For example, feedback component 244 can receive the uplink communication as feedback at a timing related to the determined offset, and/or can receive the uplink communication from the UE 115 in an uplink control channel (e.g., sPUCCH), as control data in an uplink data channel (e.g., sPUSCH), etc.

Figure 6:
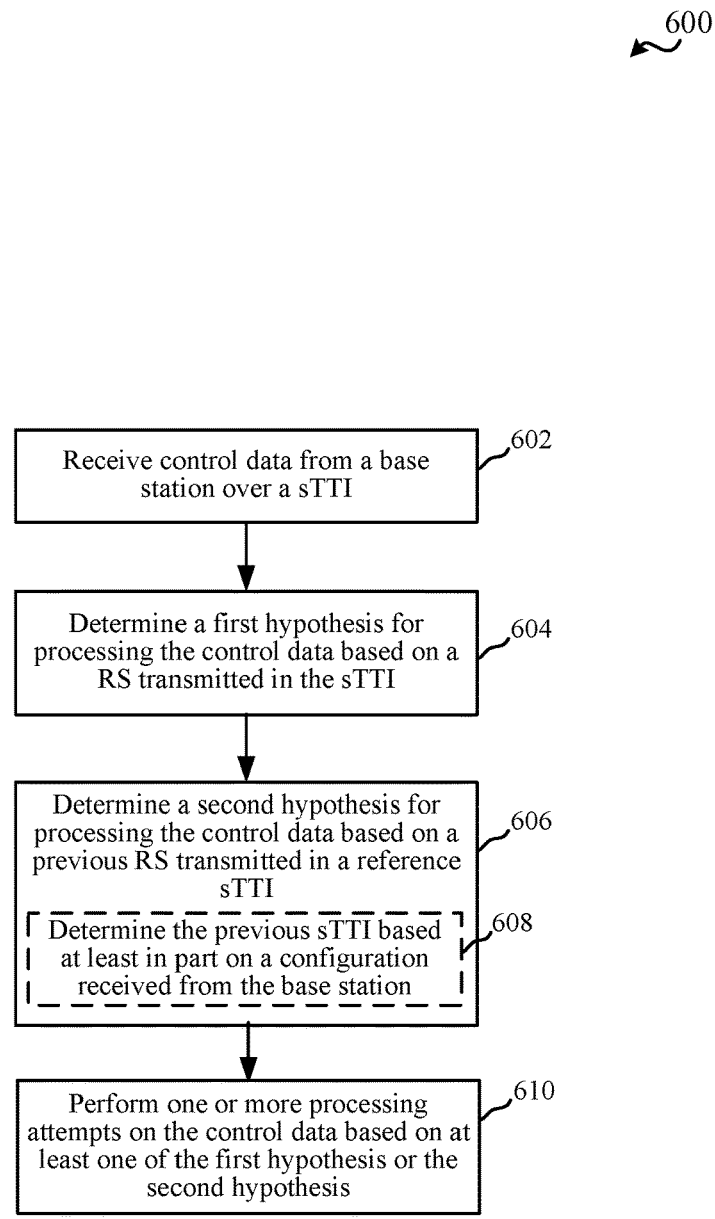
FIG. 6 is a flow chart illustrating an example of a method for performing decoding attempts of control data, in accordance with various aspects of the present disclosure.

FIG. 6 illustrates a flow chart of an example of a method 600 for processing (e.g., by a UE) control data received from a base station.

At Block 602, the UE can receive control data from a base station over a sTTI. In an aspect, communicating component 340, e.g., in conjunction with processor(s) 305, memory 302, and/or transceiver 370, can receive the control data from the base station over the sTTI. For example, the base station 105 can transmit control data in one or more symbols in the sTTI, and the control data may be based on a RS transmitted in one or more symbols in the sTTI (and/or one or more symbols in a previous sTTI). Specifically, for example, DM-RS may not be transmitted in every sTTI, and thus the UE 115 can be indicated to use a previously sent DM-RS for processing (e.g., demodulating, performing channel estimation on, or otherwise decoding) one or more channels from the base station 105. In applying this for control data, there may be multiple hypotheses on whether the DM-RS is sent in a sTTI and/or which DM-RS to use from a previous sTTI where the DM-RS is not sent.

At Block 604, the UE can determine a first hypothesis for processing the control data based on a RS transmitted in the sTTI. In an aspect, decoding component 344, e.g., in conjunction with processor(s) 305, memory 302, and/or transceiver 370, can determine the first hypothesis for processing the control data based on the RS transmitted in the sTTI. For example, decoding component 344 can determine the first hypothesis for processing control data based on a DM-RS being transmitted in the sTTI. As described in further detail below, the UE 115 may not know if a DM-RS is included in the sTTI, and thus the first hypothesis can be used in an attempt to blindly decode or process the control data on the assumption that the sTTI includes a DM-RS to use in decoding the control data.

At Block 606, the UE can determine a second hypothesis for processing the control data based on a previous RS transmitted in a reference sTTI. In an aspect, decoding component 344, e.g., in conjunction with processor(s) 305, memory 302, and/or transceiver 370, can determine the second hypothesis for processing the control data based on the previous RS transmitted in the reference sTTI. For example, decoding component 344 may determine the reference sTTI for obtaining the previous RS for the second hypothesis based on an open-loop precoding (e.g., through precoding cycling) or closed-loop precoding, as described further herein.

At Block 608, the UE can optionally determine the previous sTTI based at least in part on a configuration stored in a memory (e.g., memory 302), received from the base station, etc. In an aspect, decoding component 344, e.g., in conjunction with processor(s) 305, memory 302, and/or transceiver 370, can determine the previous sTTI based at least in part on the configuration received from the base station (e.g., base station 105). For instance, the UE 115 may receive the configuration as a function of the number of symbols in the sTTI used for the legacy PDCCH. The configuration may be received, in one example, based on establishing communications with the base station 105 and unrelated to RS signaling. For example, the base station 105 may indicate 1 or 3 symbols are used for PDCCH, which can correspond to a downlink sTTI pattern of [3,2,2,2,2,3], indicating that the subframe is divided into six sTTIs of 3 symbols, 2 symbols, 2 symbols, 2 symbols, 2 symbols, and 3 symbols, respectively (or [3,2,2] for slot 0 and [2,2,3] for slot 1). In another example, the base station 105 may indicate that 2 symbols are used for PDCCH, which can correspond to a downlink sTTI pattern of [2, 3, 2, 2, 2, 2, 3], indicating that the subframe is divided into six sTTIs of 2 symbols, 3 symbols, 2 symbols, 2 symbols, 2 symbols, and 3 symbols, respectively (or [2,3,2] for slot 0 and [2,2,3] for slot 1). In an example, in the open-loop precoding scenario, when PDCCH spans over one symbol, the first sTTI within each slot can be configured as reference sTTI for obtaining the RS for sTTIs in the slot. In an example, in the open-loop precoding scenario, when PDCCH spans over either 2 or 3 symbols, the second sTTI within slot 0 and the first sTTI within slot 1 can be configured as reference sTTI for obtaining the RS for sTTIs in the respective slot. In the reference sTTI, decoding component 344 may decode control data based on the first hypothesis (e.g., that the RS is present).

In another example, e.g., for closed-loop precoding, decoding component 344 may receive the configuration (e.g., as stored in a memory 302, via broadcast signaling, higher layer signaling such as RRC, etc. from the base station 105), which may indicate one or more fixed sTTI locations as reference sTTIs that include RSs to be used for processing control data communications. In another example, decoding component 344 can consider a previous (e.g., adjacent) sTTI as the reference sTTI (e.g., based on an indicator received from the base station 105 to consider the previous sTTI, or otherwise). In yet another example, decoding component 344 may receive the configuration (e.g., via broadcast signaling, higher layer signaling such as RRC, etc.) as an indication from the base station 105 of a window size of possible reference sTTIs to be considered. In this example, decoding component 344 can obtain a RS in each of the reference sTTIs within the window (e.g., a window of previously received sTTIs).

For example, based on sTTI pattern, open-loop or closed-loop precoding, the indication as to the number of symbols used for PDCCH (e.g., 1 or 3, or 2), etc., decoding component 344 can accordingly determine the sTTI having the RS as the reference sTTI for processing control data in the present sTTI. For example, decoding component 344 can be configured with logic for determining the sTTI having the RS based on the examples above, and can accordingly determine the sTTI based on one or more parameters indicating sTTI pattern, open-loop or closed-loop precoding, number of symbols used for PDCCH, etc. In another example, decoding component 344 can be configured (e.g., by base station 105) with the location of the sTTI having the RS. In one example, decoding component 344 may determine presence of the RS based on successful decoding of the control data based on the first hypothesis in the reference sTTI. In an example, the window size may be cell-specific and/or UE-specific and/or may be updated semi-statically via higher layer signaling, such as RRC signaling, by the base station 105.

At Block 610, the UE can perform one or more processing attempts on the control data based on at least one of the first hypothesis or the second hypothesis. In an aspect, decoding component 344, e.g., in conjunction with processor(s) 305, memory 302, and/or transceiver 370, can perform the one or more processing attempts on the control data based on at least one of the first hypothesis or the second hypothesis. For example, decoding component 344 can perform the one or more processing attempts to include demodulating, performing channel estimation, or otherwise decoding the control data based on the first and second hypotheses, and utilizing whichever result produces a successful processing. As described, for example, the second hypothesis can be based on determining a reference sTTI from which to obtain the reference signal for processing the control data. This can be useful, for example, where the RS is a DM-RS and thus may be transmitted in the first or second symbol of a sTTI. In this example, where the DM-RS is not included in the sTTI for the symbol being decoded, processing the control data using the first hypothesis may fail. Thus, decoding component 344 can attempt the second hypothesis based on a previously received DM-RS corresponding to the determined reference sTTI.

Figure 7:
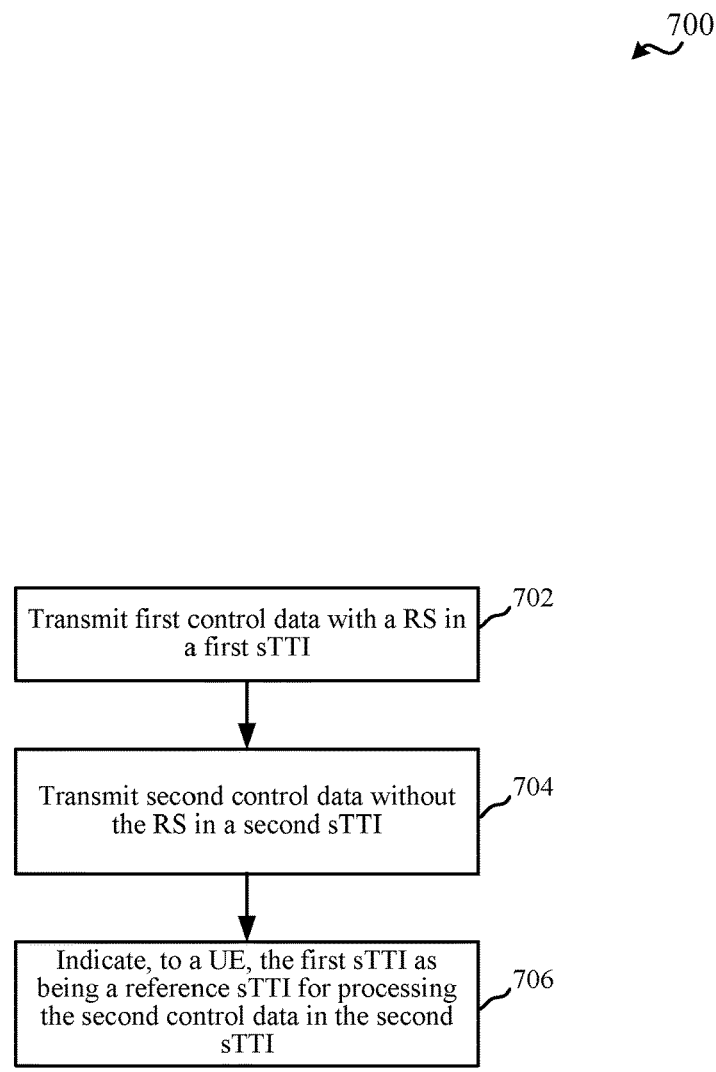
FIG. 7 is a flow chart illustrating an example of a method for indicating reference transmission time intervals, in accordance with various aspects of the present disclosure.

FIG. 7 illustrates a flow chart of an example of a method 700 for indicating (e.g., by a base station) reference sTTIs from which reference signals can be obtained for decoding control data in a current TTI.

At Block 702, the base station can transmit first control data with a RS in a first sTTI. In an aspect, RS indicating component 242, e.g., in conjunction with processor(s) 205, memory 202, and/or transceiver 270, can transmit the first control data with the RS in a first sTTI. For example, RS indicating component 242 can transmit a RS in a same or preceding symbol as the control data, and thus the UE 115 may use the RS to process the control data (e.g., using the first hypothesis, as described above).

At Block 704, the base station can transmit second control data without the RS in a second sTTI. In an aspect, RS indicating component 242, e.g., in conjunction with processor(s) 205, memory 202, and/or transceiver 270, can transmit the second control data without the RS in the second sTTI. For example, RS indicating component 242 can transmit the RS in a different sTTI or subsequent symbol in the sTTI, and thus the UE 115 may not be able to process the control data using the RS (e.g., as is possible in the case of DM-RS).

At Block 706, the base station can indicate, to a UE, the first sTTI as being a reference sTTI for processing the second control data in the second sTTI. In an aspect, reference TTI component 246, e.g., in conjunction with processor(s) 205, memory 202, and/or transceiver 270, can indicate, to the UE (e.g., to UE 115), the first sTTI as being the reference sTTI for processing the second control data in the second sTTI. For example, reference TTI component 246 may indicate the reference sTTI based on a configuration that indicates reference sTTIs having RSs for other sTTIs (e.g., by broadcast signaling, RRC signaling, or other configuration). In one example, this may correspond to an indicated sTTI pattern, open-loop or closed-loop precoding indication, indication of a number of symbols used in PDCCH (e.g., 1 or 3, or 2), etc., as described above. In another example, e.g., for closed-loop precoding, reference TTI component 246 may indicate one or more fixed sTTI locations as reference sTTIs that include RSs to be used for processing control data communications, and/or an indicator that the UE 115 should consider a previous (e.g., adjacent) sTTI as the reference sTTI, and/or the like. In another example, reference TTI component 246 can configure the UE 115 with a window size of previous sTTIs that may be reference sTTIs that include an RS for processing the control data. As described, for example, this can enable the UE 115 to obtain a previous RS from one of the sTTIs in the window preceding the current sTTI according to the window size (e.g., going back a number of sTTIs until an RS is obtained).

Figure 8:
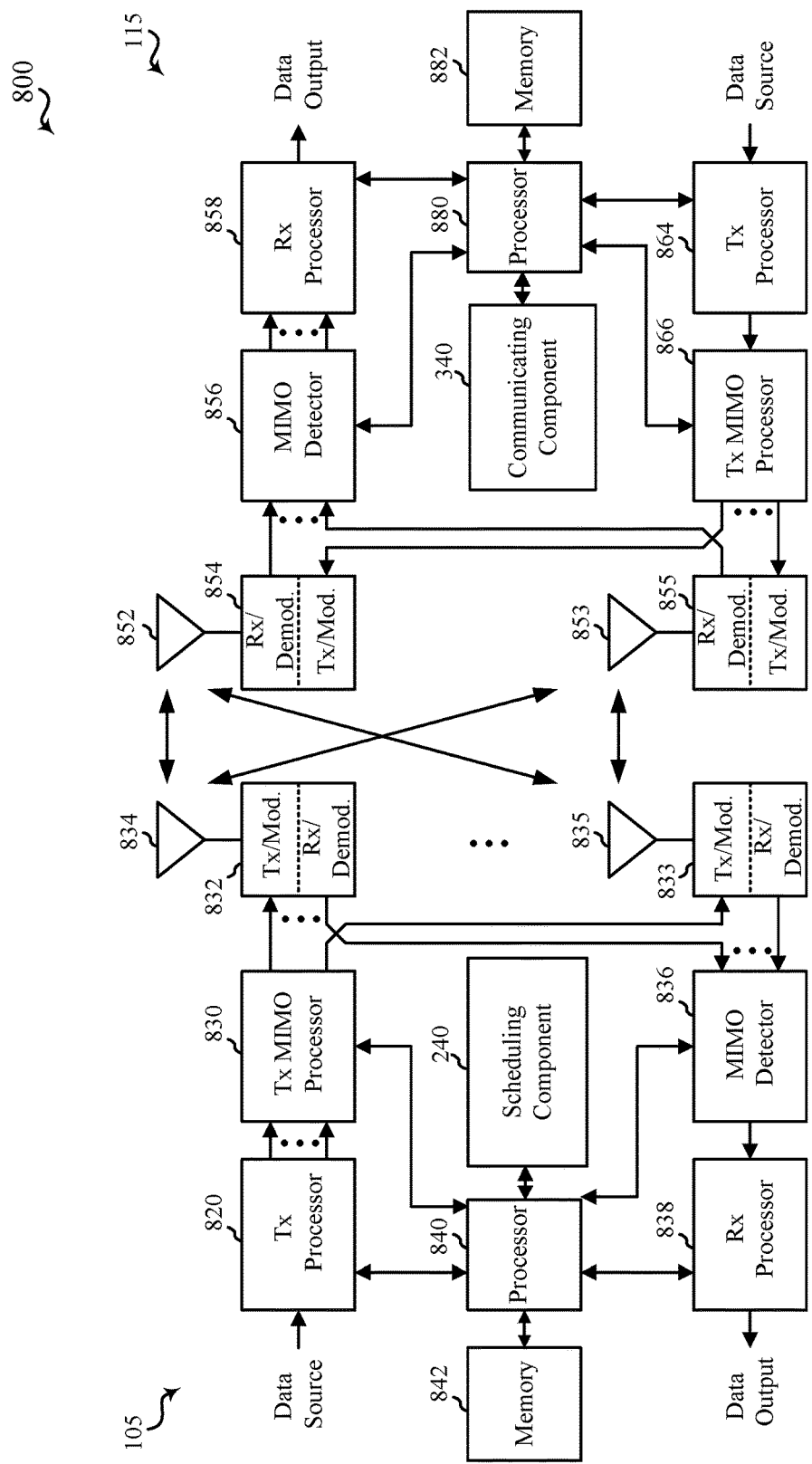
FIG. 8 is a block diagram illustrating an example of a MIMO communication system including a base station and a UE, in accordance with various aspects of the present disclosure.

FIG. 8 is a block diagram of a MIMO communication system 800 including a base station 105 and a UE 115. The MIMO communication system 800 may illustrate aspects of the wireless communication system 100 described with reference to FIG. 1. The base station 105 may be an example of aspects of the base station 105 described with reference to FIGS. 1, 2, and 3. The base station 105 may be equipped with antennas 834 and 835, and the UE 115 may be equipped with antennas 852 and 853. In the MIMO communication system 800, the base station 105 may be able to send data over multiple communication links at the same time. Each communication link may be called a "layer" and the "rank" of the communication link may indicate the number of layers used for communication. For example, in a 2×2 MIMO communication system where base station 105 transmits two "layers," the rank of the communication link between the base station 105 and the UE 115 is two.

At the base station 105, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UE 115 may be an example of aspects of the UEs 115 described with reference to FIGS. 1, 2, and 3. At the UE 115, the UE antennas 852 and 853 may receive the DL signals from the base station 105 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 115 to a data output, and provide decoded control information to a processor 880, or memory 882.

The processor 880 may in some cases execute stored instructions to instantiate a communicating component 340 (see e.g., FIGS. 1 and 3).

On the uplink (UL), at the UE 115, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for SC-FDMA, etc.), and be transmitted to the base station 105 in accordance with the communication parameters received from the base station 105. At the base station 105, the UL signals from the UE 115 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The processor 840 may in some cases execute stored instructions to instantiate a scheduling component 240 (see e.g., FIGS. 1 and 2).

The components of the UE 115 may, individually or collectively, be implemented with one or more ASICs adapted to perform some or all of the applicable functions in hardware. Each of the noted modules may be a means for performing one or more functions related to operation of the MIMO communication system 800. Similarly, the components of the base station 105 may, individually or collectively, be implemented with one or more ASICs adapted to perform some or all of the applicable functions in hardware. Each of the noted components may be a means for performing one or more functions related to operation of the MIMO communication system 800.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD- ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for communicating in a wireless communications system configured to provide at least a first type of reference signal (RS) having an associated first timeline for uplink communication and an associated first timing advance for transmitting the uplink communication, and a second type of RS having an associated second timeline for uplink communication and an associated second timing advance for transmitting the uplink communication, the method comprising:
    receiving, by a user equipment (UE), a configuration for communicating with a base station according to the first type of RS or the second type of RS, wherein the first type of RS is a cell-specific RS, and the second type of RS is a demodulation RS;
    receiving a downlink communication from the base station in accordance with the configuration;
    determining a timeline and a timing advance configured for transmitting an uplink communication corresponding to the downlink communication, wherein the timeline is one of the associated first timeline for the first type of RS or the associated second timeline for the second type of RS, wherein the timing advance is one of the associated first timing advance configured for the first type of RS or the associated second timing advance configured for the second type of RS, and wherein the associated first timing advance is different from the associated second timing advance; and
    transmitting, based on the timing advance and the timeline, the uplink communication to the base station.

2. The method of claim 1, wherein the timeline further relates to:
    a first offset for transmitting the uplink communication, wherein the first offset is determined in relation to a transmission time interval (TTI) during which the downlink communication is received based on the first type of RS; or
    a second offset for transmitting the uplink communication, wherein the second offset is determined in relation to a transmission time interval (TTI) during which the downlink communication is received based on the second type of RS.

3. The method of claim 2, wherein the timeline is further based on a number of symbols used to transmit the downlink communication.

4. The method of claim 1, further comprising processing the downlink communication using the first type of RS or the second type of RS based at least in part on an indicator received from the base station.

5. The method of claim 4, further comprising determining a rate matching indicator received from the base station based on processing the downlink communication using the first type of RS or the second type of RS.

6. The method of claim 5, wherein determining the rate matching indicator comprises determining that downlink grants are over a first symbol in a short transmission time interval (sTTI) and uplink grants are over a second symbol in the sTTI based on determining to process the downlink communication based on the second type of RS.

7. The method of claim 6, further comprising determining whether uplink grants are present in the second symbol based on the rate matching indicator.

8. The method of claim 6, further comprising determining one or more portions of the second symbol that are used for uplink grants based on the rate matching indicator.

9. The method of claim 5, wherein determining the rate matching indicator comprises determining that downlink grants and uplink grants are over at least a first symbol and a second symbol in a short transmission time interval (sTTI) based on determining to process the downlink communication based on the second type of RS.

10. An apparatus for communicating in a wireless communications system configured to provide at least a first type of reference signal (RS) having an associated first timeline for uplink communication and an associated first timing advance for transmitting the uplink communication, and a second type of RS having an associated second timeline for uplink communication and an associated second timing advance for transmitting the uplink communication, the apparatus comprising:
    a transceiver for communicating one or more wireless signals via at least a transmitter and one or more antennas;
    a memory configured to store instructions; and
    one or more processors communicatively coupled with the transceiver and the memory, wherein the one or more processors are configured to:
        receive a configuration for communicating with a base station according to the first type of RS or the second type of RS, wherein the first type of RS is a cell-specific RS, and the second type of RS is a demodulation RS;
        receive a downlink communication from the base station in accordance with the configuration;
        determine a timeline and a timing advance configured for transmitting an uplink communication corresponding to the downlink communication, wherein the timeline is one of the associated first timeline for the first type of RS or the associated second timeline for the second type of RS, wherein the timing advance is one of the associated first timing advance configured for the first type of RS or the associated second timing advance configured for the second type of RS, and wherein the associated first timing advance is different from the associated second timing advance; and transmit, based on the timing advance and the timeline, the uplink communication to the base station.

11. The apparatus of claim 10, wherein the timeline further relates to:
a first offset for transmitting the uplink communication, wherein the first offset is determined in relation to a transmission time interval (TTI) during which the downlink communication is received based on the first type of RS; or
a second offset for transmitting the uplink communication, wherein the second offset is determined in relation to a transmission time interval (TTI) during which the downlink communication is received based on the second type of RS.

12. The apparatus of claim 11, wherein the timeline is further based on a number of symbols used to transmit the downlink communication.

13. The apparatus of claim 10, wherein the one or more processors are further configured to process the downlink communication using the first type of RS or the second type of RS based at least in part on an indicator received from the base station.

14. The apparatus of claim 13, wherein the one or more processors are further configured to determine a rate matching indicator received from the base station based on processing the downlink communication using the first type of RS or the second type of RS.

15. The apparatus of claim 14, wherein the one or more processors are configured to determine the rate matching indicator at least in part by determining that downlink grants are over a first symbol in a short transmission time interval (sTTI) and uplink grants are over a second symbol in the sTTI based on determining to process the downlink communication based on the second type of RS.

16. The apparatus of claim 15, wherein the one or more processors are further configured to determine whether uplink grants are present in the second symbol based on the rate matching indicator.

17. The apparatus of claim 15, wherein the one or more processors are further configured to determine one or more portions of the second symbol that are used for uplink grants based on the rate matching indicator.

18. The apparatus of claim 14, wherein the one or more processors are configured to determine the rate matching indicator at least in part by determining that downlink grants and uplink grants are over at least a first symbol and a second symbol in a short transmission time interval (sTTI) based on determining to process the downlink communication based on the second type of RS.

19. An apparatus for communicating in a wireless communications system configured to provide at least a first type of reference signal (RS) having an associated first timeline for uplink communication and an associated first timing advance for transmitting the uplink communication, and a second type of RS having an associated second timeline for uplink communication and an associated second timing advance for transmitting the uplink communication, the apparatus comprising:

means for receiving a configuration for communicating with a base station according to the first type of RS or the second type of RS, wherein the first type of RS is a cell-specific RS, and the second type of RS is a demodulation RS;
means for receiving a downlink communication from the base station in accordance with the configuration;
means for determining a timeline and a timing advance configured for transmitting an uplink communication corresponding to the downlink communication, wherein the timeline is one of the associated first timeline for the first type of RS or the associated second timeline for the second type of RS, wherein the timing advance is one of the associated first timing advance configured for the first type of RS or the associated second timing advance configured for the second type of RS, and wherein the associated first timing advance is different from the associated second timing advance; and
means for transmitting, based on the timing advance and the timeline, the uplink communication to the base station.

20. The apparatus of claim 19, wherein the timeline further relates to:
a first offset for transmitting the uplink communication, wherein the first offset is determined in relation to a transmission time interval (TTI) during which the downlink communication is received based on the first type of RS; or
a second offset for transmitting the uplink communication, wherein the second offset is determined in relation to a transmission time interval (TTI) during which the downlink communication is received based on the second type of RS.

21. The apparatus of claim 20, wherein the timeline is further based on a number of symbols used to transmit the downlink communication.

22. A non-transitory computer-readable medium, comprising code executable by one or more processors for communicating in a wireless communications system configured to provide at least a first type of reference signal (RS) having an associated first timeline for uplink communication and an associated first timing advance for transmitting the uplink communication, and a second type of RS having an associated second timeline for uplink communication and an associated second timing advance for transmitting the uplink communication, the code comprising:
code for receiving, by a user equipment (UE), a configuration for communicating with a base station according to the first type of RS or the second type of RS, wherein the first type of RS is a cell-specific RS, and the second type of RS is a demodulation RS;
code for receiving a downlink communication from the base station in accordance with the configuration;
code for determining a timeline and a timing advance configured for transmitting an uplink communication corresponding to the downlink communication, wherein the timeline is one of the associated first timeline for the first type of RS or the associated second timeline for the second type of RS, wherein the timing advance is one of the associated first timing advance configured for the first type of RS or the associated second timing advance configured for the second type of RS, and wherein the associated first timing advance is different from the associated second timing advance; and code for transmitting, based on the timing advance and the timeline, the uplink communication to the base station.

23. The non-transitory computer-readable medium of claim 22, wherein the timeline further relates to:
- a first offset for transmitting the uplink communication, wherein the first offset is determined in relation to a transmission time interval (TTI) during which the downlink communication is received based on the first type of RS; or
- a second offset for transmitting the uplink communication, wherein the second offset is determined in relation to a transmission time interval (TTI) during which the downlink communication is received based on the second type of RS.

24. The non-transitory computer-readable medium of claim 23, wherein the timeline is further based on a number of symbols used to transmit the downlink communication.

* * * * *